US012640146B2

(12) United States Patent
Arita et al.

(10) Patent No.: US 12,640,146 B2
(45) Date of Patent: May 26, 2026

(54) INFORMATION PROCESSING APPARATUS, INFORMATION PROCESSING METHOD AND RECORDING MEDIUM

(71) Applicant: NEC Corporation, Tokyo (JP)

(72) Inventors: Eishi Arita, Tokyo (JP); Ryutaro Shikano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 513 days.

(21) Appl. No.: 17/924,466

(22) PCT Filed: May 20, 2020

(86) PCT No.: PCT/JP2020/019913
§ 371 (c)(1),
(2) Date: Nov. 10, 2022

(87) PCT Pub. No.: WO2021/234850
PCT Pub. Date: Nov. 25, 2021

(65) Prior Publication Data
US 2023/0186910 A1     Jun. 15, 2023

(51) Int. Cl.
*G10L 15/22*      (2006.01)
*G06F 9/451*      (2018.01)

(52) U.S. Cl.
CPC .............. *G10L 15/22* (2013.01); *G06F 9/453* (2018.02); *G10L 2015/223* (2013.01)

(58) Field of Classification Search
CPC ...... G06F 3/0481; G06F 3/0484; G06F 3/167; G06F 9/453; G10L 15/22; G10L 2015/223
See application file for complete search history.

(56) References Cited

U.S. PATENT DOCUMENTS

| | | | | |
|---|---|---|---|---|
| 10,509,534 B2 * | 12/2019 | Bradley | ................. | G06F 3/048 |
| 2010/0015585 A1 * | 1/2010 | Baker | .................... | G06V 40/23 |
| | | | | 434/247 |

(Continued)

FOREIGN PATENT DOCUMENTS

| | | | |
|---|---|---|---|
| JP | H06111133 A | * | 4/1994 |
| JP | 2004-029932 A | | 1/2004 |

(Continued)

OTHER PUBLICATIONS

International Search Report for PCT Application No. PCT/JP2020/019913, mailed on Aug. 11, 2020.

(Continued)

*Primary Examiner* — Angela A Armstrong
(74) *Attorney, Agent, or Firm* — Sughrue Mion, PLLC

(57)     ABSTRACT

An information processing apparatus (2) is an information processing apparatus for assisting an operation by an user of a terminal apparatus (1) that is operable by the user, and includes: a determination unit (211) for determining a procedure of an operation that should be performed by the user based on sound data that indicates, as a sound, a question from the user about the operation of the terminal apparatus and an information related to a present screen displayed on a display unit (14) of the terminal apparatus when the user asks the question about the operation of the terminal apparatus; and a control unit (212) for controlling the display unit to perform an assist display processing for encouraging the user to operate the terminal apparatus with the procedure determined by the determination unit.

9 Claims, 7 Drawing Sheets

14

(56) References Cited

U.S. PATENT DOCUMENTS

| | | | |
|---|---|---|---|
| 2017/0300887 A1 | 10/2017 | Miyata et al. | |
| 2019/0163437 A1 | 5/2019 | Nagasaka | |
| 2023/0229279 A1* | 7/2023 | Paul | G06F 3/04847 |
| | | | 715/767 |

FOREIGN PATENT DOCUMENTS

| | | | |
|---|---|---|---|
| JP | 2004-334313 A | 11/2004 |
| JP | 2011-053936 A | 3/2011 |
| JP | 2016-157246 A | 9/2016 |
| JP | 2017-028346 A | 2/2017 |
| JP | 2018-092664 A | 6/2018 |
| JP | 2019-075135 A | 5/2019 |
| JP | 2019-159690 A | 9/2019 |
| JP | 6692538 B1 | 5/2020 |

OTHER PUBLICATIONS

JP Office Action for JP Application No. 2022-524752, mailed on Sep. 1, 2023 with English Translation.

* cited by examiner

SYS

OPERATION ASSIST
SERVER
2

3

USER TERMINAL
1

INFORMATION PROCESSING APPARATUS, INFORMATION PROCESSING METHOD AND RECORDING MEDIUM

This application is a National Stage Entry of PCT/JP2020/ 019913 filed on May 20, 2020, the contents of all of which are incorporated herein by reference, in their entirety.

TECHNICAL FIELD

This disclosure relates to a technical field of an information processing apparatus, an information processing method and a recording medium that are configured to assist an operation by a user of a terminal apparatus that is operable by the user.

BACKGROUND ART

An information processing apparatus that is configured to notify a user of an operation procedure of a terminal apparatus to assist an operation of the terminal apparatus by the user is known. For example, a Patent Literature 1 discloses an information processing apparatus that is configured to receive, as sound data, a question about an operation method of a mobile terminal from a user of the mobile terminal that is one example of the terminal apparatus, determine a content of the question by performing a speech recognition processing on the sound data, and control the mobile terminal to display a guideline screen in response to the determined question.

Additionally, there is a Patent Literature 2 to a Patent Literature 3 as a background art document related to this disclosure.

CITATION LIST

Patent Literature

Patent Literature 1: JP2017-028346A
Patent Literature 2: JP2018-092664A
Patent Literature 3: JP2016-157246A

SUMMARY

Technical Problem

The information processing apparatus disclosed in the Patent Literature 1 always controls the mobile terminal so that the guideline screen based in response to the question is displayed on the mobile terminal, without considering a display screed displayed on the mobile terminal at a timing when the question from the user is received as the sound data. Thus, the user performs an operation related to the question on the guidance screed displayed on the mobile display. However, the user cannot know how to perform an operation unless the guidance screen is displayed, even when the user wants to perform the operation about which the user has asked in the past, because the guidance screen is always displayed when the user asks the question. Namely, the user understand the operation procedure of the mobile terminal starting from the guidance screen, however, cannot understand the operation procedure of the mobile terminal starting from the present display screen of the mobile terminal. Thus, in order to perform the target operation, the user has to ask the same question again, and the information processing apparatus has to control the terminal apparatus to display the same guidance screen again. Thus, such a technical problem arises that a frequency of assisting the user's operation does not change forever.

It is an example object of this disclosure to provide an information processing apparatus, an information processing method and a recording medium that are configured to solve the above described technical problem. As one example, it is an example object of this disclosure to provide an information processing apparatus, an information processing method and a recording medium that are configured to reduce the frequency of assisting the user's operation while assisting the user's operation.

Solution to Problem

An information processing apparatus of this disclosure is information processing apparatus that is configured to assist an operation by an user of a terminal apparatus that is operable by the user, the information processing apparatus includes: a determination unit that is configured to determine a procedure of an operation that should be performed by the user based on sound data that indicates, as a sound, a question from the user about the operation of the terminal apparatus and an information related to a present screen displayed on a display unit of the terminal apparatus when the user asks the question about the operation of the terminal apparatus; and a control unit that is configured to control the display unit to perform an assist display processing for encouraging the user to operate the terminal apparatus with the procedure determined by the determination unit.

An information processing method of this disclosure is an information processing method of assisting an operation by an user of a terminal apparatus that is operable by the user, the information processing method includes: a determination step at which a procedure of an operation that should be performed by the user is determined based on sound data that indicates, as a sound, a question from the user about the operation of the terminal apparatus and an information related to a present screen displayed on a display unit of the terminal apparatus when the user asks the question about the operation of the terminal apparatus; and a control step at which the display unit is controlled to perform an assist display processing for encouraging the user to operate the terminal apparatus with the procedure determined at the determination step.

A recording medium of this disclosure is a recording medium on which a computer program that allows a computer to execute an information processing method of assisting an operation by an user of a terminal apparatus that is operable by the user is recorded, the information processing method includes: a determination step at which a procedure of an operation that should be performed by the user is determined based on sound data that indicates, as a sound, a question from the user about the operation of the terminal apparatus and an information related to a present screen displayed on a display unit of the terminal apparatus when the user asks the question about the operation of the terminal apparatus; and a control step at which the display unit is controlled to perform an assist display processing for encouraging the user to operate the terminal apparatus with the procedure determined at the determination step.

Effect

The information processing apparatus, the information processing method and the recording medium described above are capable of reducing the frequency of assisting the user's operation while assisting the user's operation, because the present screen is considered when the procedure of the operation that should be performed by the user is determined.

DESCRIPTION OF EXAMPLE EMBODIMENTS

Next, an example embodiment of an information processing apparatus, an information processing method and a recording medium will be described with reference to the drawings. In the below described description, an operation assist system SYS to which the example embodiment of the information processing apparatus, the information processing method and the recording medium is applied will be described.

Figure 1:
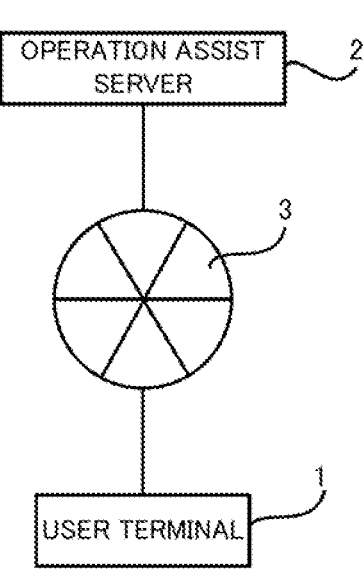
FIG. 1 is a block diagram that illustrates an entire configuration of an operation assist system in a present example embodiment.

(1) Configuration of Operation Assist System SYS (1-1) Entire Configuration of Operation Assist System SYS Firstly, with reference to FIG. 1, an entire configuration of the operation assist system SYS in the present example embodiment will be described. FIG. 1 is a block diagram that illustrates the entire configuration of the operation assist system SYS in the present example embodiment.

As illustrated in FIG. 1, the operation assist system SYS includes a user terminal 1 and an operation assist server 2. Note that the operation assist system SYS may include a single user terminal 1 or a plurality of user terminals 1. The user terminal 1 and the operation assist server 2 are configured to communicate with each other through a communication network 3. The communication network 3 may include a wired communication network, and may include a wireless communication network.

The user terminal 1 is a terminal apparatus that is operable by a user. At least one of a smartphone, a tablet and a personal computer is one example of the user terminal 1. A POS (Point of Sale System) cash register is another one example of the user terminal 1.

The operation assist server 2 is an information processing apparatus that is configured to perform an operation assist processing for assisting an operation of the user terminal 1 by the user. The operation assist operation is a processing for teaching the user a procedure of the operation of the user terminal 1 to the user who do not know the procedure of the operation of the user terminal 1 (in other words, how to operate it). Specifically, the user asks about the operation of the user terminal 1 to the user terminal 1. Especially, the user inputs, to the user terminal 1 as a sound, a question about the operation of the user terminal 1. The operation assist server 2 obtains sound data indicating, as the sound, the question from the user about the operation of the user terminal 1 from the user terminal 1. The operation assist server 2 determines the procedure of the operation that should be performed by the user based on the obtained sound data. Especially in the present example embodiment, the operation assist server 2 determines the procedure of the operation that should be performed by the user based on not only the obtained sound data but also a content of a display screen displayed on a display apparatus 14 (see FIG. 2 described later) of the user terminal 1 when the user asks about the operation of the user terminal 1 (in the below described description, the display screen displayed at this timing is referred to as a "present screen"). Thus, the operation assist server 2 may obtains not only the sound data but also a screen information related to the present screen from the user terminal 1. Then, the operation assist server 2 controls the display apparatus 14 of the user terminal 1 to perform an assist display processing for encouraging the user to operate the user terminal 1 with the determined procedure. As a result, the user is capable of performing a desired operation by using a content displayed on the display apparatus 14 by the assist display processing.

(1-2) Configuration of User Terminal 1

Figure 2:
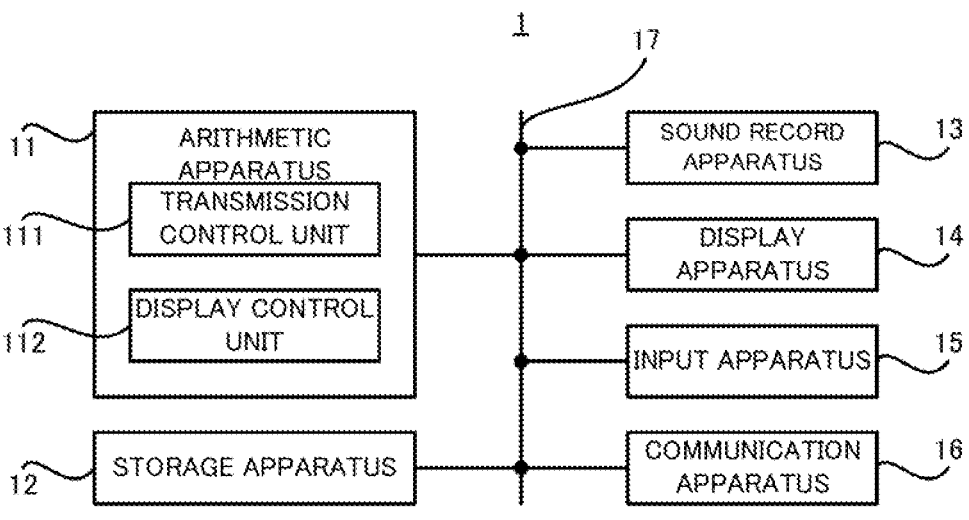
FIG. 2 is a block diagram that illustrates a configuration of a user terminal in the present example embodiment.

Next, with reference to FIG. 2, a configuration of the user terminal 1 in the present example embodiment will be described. FIG. 2 is a block diagram that illustrates the configuration of the user terminal 1 in the present example embodiment.

As illustrated in FIG. 2, the user terminal 1 includes an arithmetic apparatus 11, a storage apparatus 12, a sound record apparatus 13, a display apparatus 14 that is one specific example of a display unit, an input apparatus 15 and a communication apparatus 16. The arithmetic apparatus 11, the storage apparatus 12, the sound record apparatus 13, the display apparatus 14, the input apparatus 15 and the communication apparatus 16 are interconnected through a data bus 17.

The arithmetic apparatus 11 includes a CPU (Central Processing Unit), for example. The arithmetic apparatus 11 reads a computer program. For example, the arithmetic apparatus 11 may read a computer program stored in the storage apparatus 12. For example, the arithmetic apparatus 11 may read a computer program stored in a computer-readable and non-transitory recording medium, by using a not-illustrated recording medium reading apparatus. The arithmetic apparatus 11 may obtain (namely, download or read) a computer program from a not-illustrated apparatus placed outside the user terminal 1 through the communication apparatus 16. The arithmetic apparatus 11 executes the read computer program. As a result, a logical functional block for performing a processing that should be performed by the user terminal 1 is implemented in the arithmetic apparatus 11. Namely, the arithmetic apparatus 11 is configured to serve as a controller for implementing the logical block for performing the processing that should be performed by the user terminal 1.

FIG. 2 illustrates one example of the logical block that is implemented in the arithmetic apparatus 11 to perform the processing that should be performed by the user terminal 1. As illustrated in FIG. 2, a transmission control unit 111 and a display control unit 112 are implemented in the arithmetic apparatus 11. Note that a detail of the processing performed by the transmission control unit 111 and the display control unit 112 will be described later in detail, however, an overview thereof is briefly described here. The transmission control unit 111 is configured to transmit sound data that indicates, as a sound, a question from the user about an operation of the user terminal 1 to the operation assist server 2. Furthermore, the transmission control unit 111 is configured to transmit the screen information, which is related to a present screen displayed on the display apparatus 14 when the user asks the question about the operation of the user terminal 1, to the operation assist server 2 by using the communication apparatus 16. The display control unit 112 is configured to control the display apparatus 14 to perform an assist display processing for encouraging the user to operate the user terminal 1 with a procedure determined by the operation assist server 2. Specifically, the display control unit 112 is configured to obtain a display control information generated by the operation assist server 2 for allowing the user terminal 1 to perform the assist display processing, and to control the display apparatus 14 based on the obtained display control information to perform the assist display processing.

The storage apparatus 12 is configured to store desired data. For example, the storage apparatus 12 may temporarily store the computer program that is executed by the arithmetic apparatus 11. The storage apparatus 12 may temporarily store data temporarily used by the arithmetic apparatus 11 when the arithmetic apparatus 11 executes the computer program. The storage apparatus 12 may store data stored for a long term by the user terminal 1. The storage apparatus 12 may include at least one of a RAM (Random Access Memory), a ROM (Read Only Memory), a hard disk apparatus, a magneto-optical disc, a SSD (Solid State Drive) and a disk array apparatus.

A sound record apparatus 13 is an apparatus that is configured to record a sound of the user. In the present example embodiment, the sound record apparatus 13 is configured to record the sound of the user who asks the question about the operation of the user terminal 1. As a result, the sound record apparatus 13 generates the sound data that indicates, as the sound, the question from the user about the operation of the user terminal 1. In order to generate the sound data, the sound record apparatus 13 may include a microphone, for example.

The display apparatus 14 is an output apparatus (namely, a display) that is configured to display a desired information. The display apparatus 14 may display a display screen including a GUI (Graphical User Interface). In this case, the user may operate the user terminal 1 by using the GUI.

An input apparatus 15 is an apparatus that is configured to receive an input of the operation by the user. For example, the input apparatus 15 may include an operational apparatus that is operable by the user. One example of the operational apparatus may include at least one of a keyboard, a mouse and a touch panel. The touch panel may be integrated with the above described display apparatus 14.

The communication apparatus 16 is configured to communicate with the operation assist server 2 through the communication network 3. In the present example embodiment, the communication apparatus 16 is configured to transmit at least one of the sound data and the screen information to the operation assist server 2 through the communication network 3 under the control of the transmission control unit 111. Moreover, the communication apparatus 16 is configured to receive the display control information generated by the operation assist server 2 for allowing the user terminal 1 to perform the assist display processing from the operation assist server 2 through the communication network 3 under the control of the display control unit 112.

(1-3) Configuration of Operation Assist Server 2

Figure 3:
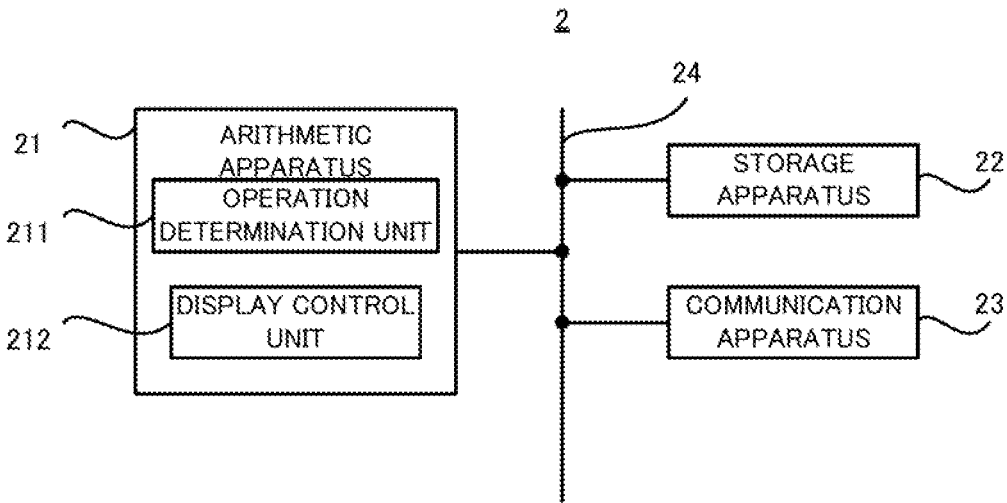
FIG. 3 is a block diagram that illustrates a configuration of an operation assist server in the present example embodiment.

Next, with reference to FIG. 3, a configuration of the operation assist server 2 in the present example embodiment will be described. FIG. 3 is a block diagram that illustrates the configuration of the operation assist server 2 in the present example embodiment.

As illustrated in FIG. 2, the operation assist server 2 includes an arithmetic apparatus 21, a storage apparatus 22 and a communication apparatus 23. The arithmetic apparatus 21, the storage apparatus 22 and the communication apparatus 23 are interconnected through a data bus 24.

The arithmetic apparatus 21 includes a CPU (Central Processing Unit), for example. The arithmetic apparatus 21 reads a computer program. For example, the arithmetic apparatus 21 may read a computer program stored in the storage apparatus 22. For example, the arithmetic apparatus 21 may read a computer program stored in a computer-readable and non-transitory recording medium, by using a not-illustrated recording medium reading apparatus. The arithmetic apparatus 21 may obtain (namely, download or read) a computer program from a not-illustrated apparatus placed outside the operation assist server 2 through the communication apparatus 23. The arithmetic apparatus 21 executes the read computer program. As a result, a logical functional block for performing a processing (specifically, the operation assist processing) that should be performed by the operation assist server 2 is implemented in the arithmetic apparatus 21. Namely, the arithmetic apparatus 21 is configured to serve as a controller for implementing the logical block for performing the processing that should be performed by the operation assist server 2.

FIG. 3 illustrates one example of the logical block that is implemented in the arithmetic apparatus 21 to perform the processing that should be performed by the operation assist server 2. As illustrated in FIG. 3, an operation determination unit 211 that is one specific example of "a determination unit" and a display control unit 212 that is one specific example of "a control unit" are implemented in the arithmetic apparatus 21. Note that a detail of the processing performed by the operation determination unit 211 and the display control unit 212 will be described later in detail, however, an overview thereof is briefly described here. The operation determination unit 211 is configured to determine the procedure of the operation that should be performed by the user based on the sound data and the screen information transmitted from the user terminal 1. The display control unit 212 is configured to control the user terminal 1 to perform the assist display processing for encouraging the user to operate the user terminal 1 with the procedure determined by the operation determination unit 211. Specifically, the display control unit 212 is configured to generate the display control information for controlling the user terminal 1 (especially, the display apparatus 14) so that the user terminal 1 performs the assist display processing, and to transmit the generated display control information to the user terminal 1 by using the communication apparatus 23.

The storage apparatus 22 is configured to store desired data. For example, the storage apparatus 22 may temporarily store the computer program that is executed by the arithmetic apparatus 21. The storage apparatus 22 may temporarily store data temporarily used by the arithmetic apparatus 21 when the arithmetic apparatus 21 executes the computer program. The storage apparatus 22 may store data stored for a long term by the operation assist server 2. The storage apparatus 22 may include at least one of a RAM, a ROM, a hard disk apparatus, a magneto-optical disc, a SSD and a disk array apparatus.

The communication apparatus 23 is configured to communicate with the user terminal 1 through the communication network 3. In the present example embodiment, the communication apparatus 23 is configured to receive at least one of the sound data and the screen information from the user terminal 1 through the communication network 3. Moreover, the communication apparatus 23 is configured to transmit the display control information generated by the display control unit 212 for allowing the user terminal 1 to perform the assist display processing to the user terminal 1 through the communication network 3 under the control of the display control unit 212.

(2) Flow of Operation Assist Processing Performed by Operation Assist Server 2

Figure 4:
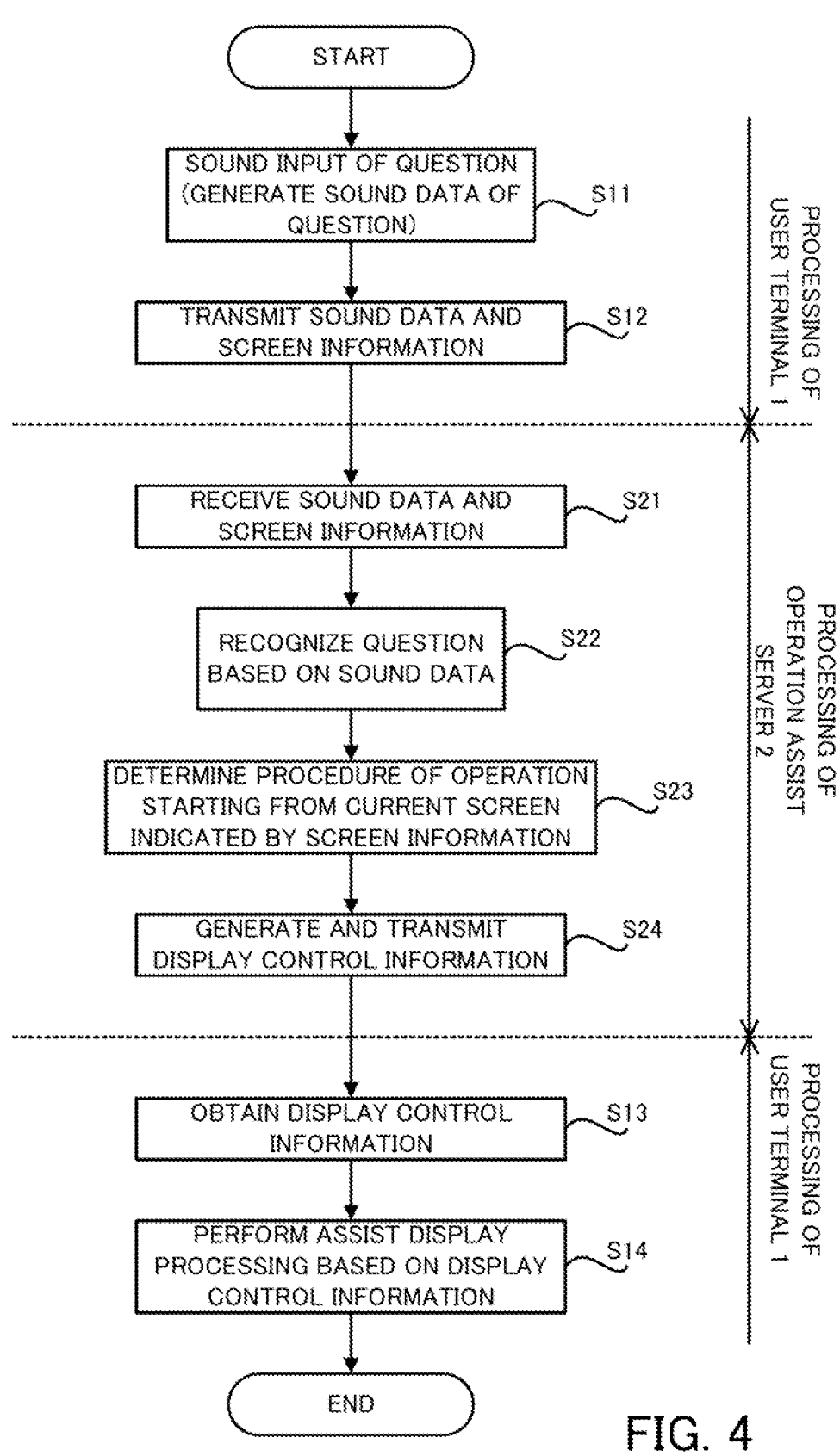
FIG. 4 is a flow chart that illustrates a flow of an operation assist processing performed by the operation assist server.

Next, with reference to FIG. 4, a flow of the operation assist processing performed by the operation assist server 2 will be described. FIG. 4 is a flow chart that illustrates the flow of the operation assist processing performed by the operation assist server 2. Note that the operation assist processing is a processing that is mainly performed by the operation assist server 2, however, FIG. 4 also illustrates a processing performed by the user terminal 1 for the purpose of clear description.

As illustrated in FIG. 4, when the user asks the question about the operation of the user terminal 1, the sound record apparatus 13 of the user terminal 1 records the sound of the user who asks the question about the operation of the user terminal 1 (a step S11). As a result, the sound record apparatus 13 generates the sound data that indicates, as the sound, the question from the user about the operation of the user terminal 1 (the step S11).

When the sound data is generated, the transmission control unit 111 of the user terminal 1 transmits the sound data that indicates, as the sound, the question from the user about the operation of the user terminal 1 to the operation assist server 2 by using the communication apparatus 16 (a step S12).

Furthermore, the transmission control unit 111 transmits the screen information, which is related to the present screen displayed on the display apparatus 14 when the user asks the question about the operation of the user terminal 1, to the operation assist server 2 by using the communication apparatus 16 (the step S12). Namely, the transmission control unit 111 transmits the screen information, which is related to the present screen displayed on the display apparatus 14 when the sound data is generated at the step S11, to the operation assist server 2 by using the communication apparatus 16 (the step S12). Specifically, the transmission control unit 111 generate the screen information based on the content of the present screen displayed on the display apparatus 14, and transmits the generated screen information to the operation assist server 2. The screen information may include an information indicating what display screen the present screen is. For example, the screen information may include an information related to a display object included in the present screen. For example, when the present screen includes the GUI, the screen information may include the information related to the display object constituting the GUI included in the present screen.

Figure 5:
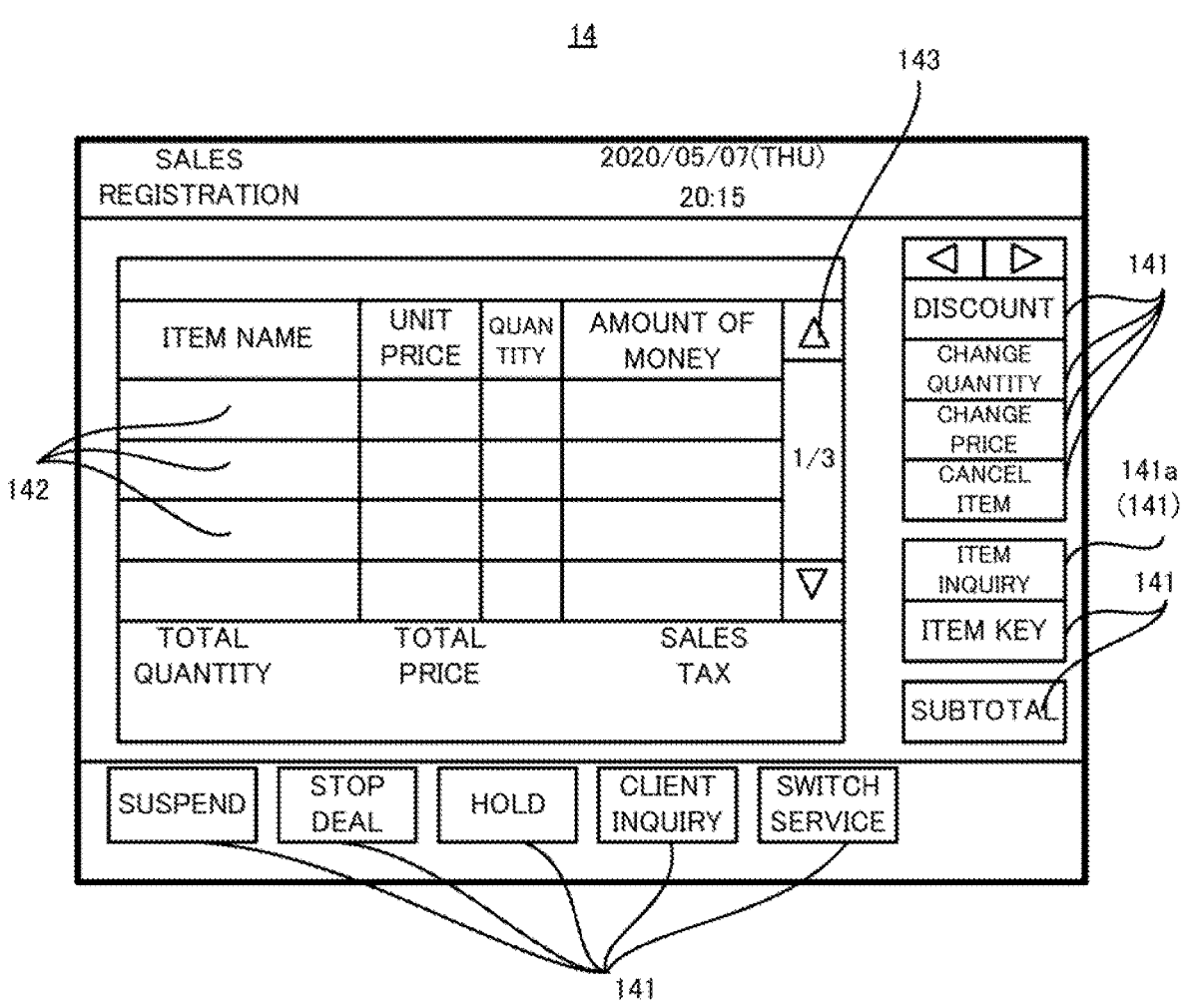
FIG. 5 is a planar view that illustrates one example of a display screen displayed on a display apparatus.

FIG. 5 illustrates one example of the display screen including the GUI. FIG. 5 illustrates one example of the display screen displayed on the display apparatus 14 when the user terminal 1 is a POS (Point of Sale System) cash register. Especially, FIG. 5 illustrates one example of the display screen that is referred to as "a sales registration screen" displayed when an item is sold by using the POS cash register. As illustrated in FIG. 5, the display screen may include, as one example of the display object constituting the GUI, at least one button 141 that is selectable by the user. The display screen may include, as one example of the display object constituting the GUI, a display field 142 in which any information can be displayed (for example, a display filed in which at least one of a name, a unit price, a quantity and an amount to f money of the item a barcode of which is scanned). The display screen may include, as one example of the display object constituting the GUI, a scroll bar 143 that is operable by the user to scroll a displayed content in the display field 142.

Again in FIG. 4, the communication apparatus 23 of the operation assist server 2 receives (namely, obtains) the sound data and the screen information transmitted from the user terminal 1 (a step S21). The sound data and the screen information received by the communication apparatus 23 is outputted to the operation determination unit 211. Then, the operation determination unit 211 determines the procedure of the operation that should be performed by the user based on the sound data and the screen information received at the step S21 (a step S22 to a step S23).

Specifically, the operation determination unit 211 determines a content of the question from the user based on the sound data (the step S22). For example, the operation determination unit 211 may determine the content of the question from the user by performing a speech recognition processing on the sound data.

Then, the operation determination unit 211 determines the procedure of the operation that should be performed by the user based on the content of the question from the user determined at the step S22 (a step S23). Namely, the operation determination unit 211 determines the operation which the user wants to perform by using the user terminal 1 (namely, a target operation) based on the content of the question from the user determined at the step S22, and determines the procedure of the operation which the user should actually perform by using the user terminal 1 to perform the determined operation.

Especially in the present example embodiment, the operation determination unit 211 determines the procedure of the operation that should be performed by the user starting from the present screen indicated by the screen information Namely, the operation determination unit 211 determines the procedure of the operation that should be performed by the user from the present screen in order for the user to perform the target operation. In other words, the operation determination unit 211 determines the procedure of a series of operations including the operation that should be performed by the user on the present screen in order for the user to perform the target operation. For example, when the user should display a predetermined information on the present screen by performing a first operation on the present screen and then perform a second operation on the displayed predetermined information in order for the user to perform the target operation, the operation determination unit 211 determines such a procedure that the first operation is performed on the present screen and then the second operation is performed on the displayed predetermined information. For example, when the user should makes the display apparatus 14 display another display screen instead of the present screen by performing a third operation on the present screen and then perform a fourth operation on the displayed another display screen in order for the user to perform the target operation, the operation determination unit 211 determines such a procedure that the third operation is performed on the present screen and then the fourth operation is performed on the displayed another display screen.

Then, the display control unit 212 assists the user terminal 1 user terminal 1 to perform the assist display processing for encouraging the user to operate the user terminal 1 with the procedure determined at by the operation determination unit 211 at the step S23 (a step S24). Specifically, the display control unit 212 generates the display control information for controlling the user terminal 1 (especially, the display apparatus 14) so that the user terminal 1 performs the assist display processing (the step S24). Furthermore, the display control unit 212 transmits the generated display control information to the user terminal 1 by using the communication apparatus 23 (the step S24).

The assist display processing may include a processing for displaying a content of the operation, which should be performed by the user on the display screen displayed on the display apparatus 14 of the user terminal 1, on this display screen. For example, the assist display processing may include a processing for displaying a text message indicating the content of the operation, which should be performed by the user on the display screen, on this display screen. For example, the assist display processing may include a processing for displaying a graphic (in other words, an illustration) indicating the content of the operation, which should be performed by the user on the display screen, on this display screen.

The assist display processing may include a processing for highlighting an operation target area that should be operated by the user (typically, an area that should be selected by the user) on the display screen. Namely, the assist display processing may include a processing for displaying the operation target area on the display screen so that the operation target area is more high-visibility than an area other than the operation target area. The operation target area may include an area in which at least a part of the display object constituting the GUI included in the display screen. For example, when the user should push one button 141 (see FIG. 5) on the display screen, the operation target area may include an area in which the one button 141 that should be pushed by the user is displayed. For example, when the user should select one article displayed in the display field 142 on the display screen, the operation target area may include an area in which the one article of the display field 142 that should be selected by the user is displayed.

Since the operation determination unit 211 determines the procedure of the operation that should be performed by the user as described above, the user needs to perform a series of operations (namely, a plurality of operations) in sequence in some cases. Namely, as described above, the user needs to perform the first operation and then perform the second operation in some cases. Thus, the assist display processing may include a processing for displaying contents of the plurality of operations that should be performed by the user in sequence. For example, the assist display processing may include a processing for displaying the content of the first operation that should be performed by the user and then displaying the content of the second operation that should be performed following the first operation by the user after the first operation is performed by the user. Similarly, the assist display processing may include a processing for highlighting a plurality of operation target areas, which should be operated by the user in sequence on the display screen in order to perform the plurality of operations in sequence, in sequence. For example, the assist display processing may include a processing for highlighting a first operation target are that should be operated by the user to perform the first operation and then highlighting a second operation target are that should be operated following the first operation target area by the user after the first operation target area is operated by the user (namely, the first operation is performed by the user).

As described above, the operation determination unit 211 determines the procedure of the operation that should be performed by the user starting from the present screen. Thus, the assist display processing is performed starting from the present screen. Thus, the assist display processing may include a processing for displaying the content of the operation, which should be performed by the user on the present screen, on this present screen. Namely, the assist display processing may include a processing for superimposing the content of the operation, which should be performed by the user on the present screen, on this present screen. The assist display processing may include a processing for highlighting the operation target area, which should be operated by the user on the present screen, on this present screen.

Then, the communication apparatus 16 of the user terminal 1 receive (namely, obtains) the display control information transmitted from the operation assist server 2 (a step S13). The display control information received by the communication apparatus 16 is outputted to the display control unit 112. Then, the display control unit 112 controls the display apparatus 14 to perform the assist display processing based on the display control information received at the step S13 (a step S14).

(3) Specific Example of Assist Display Processing

Figure 6:
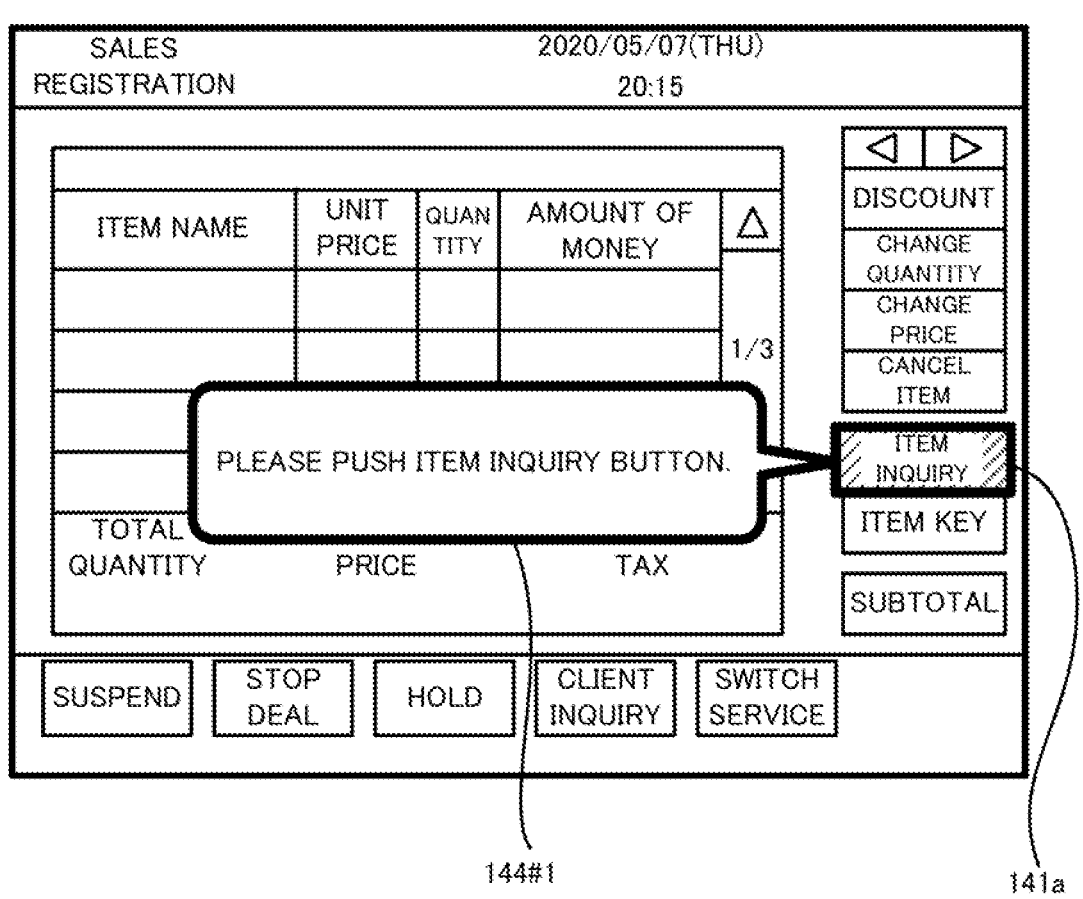
FIG. 6 is a planar view that illustrates the display screen of the display apparatus on which an assist display processing is performed.
Figure 7:
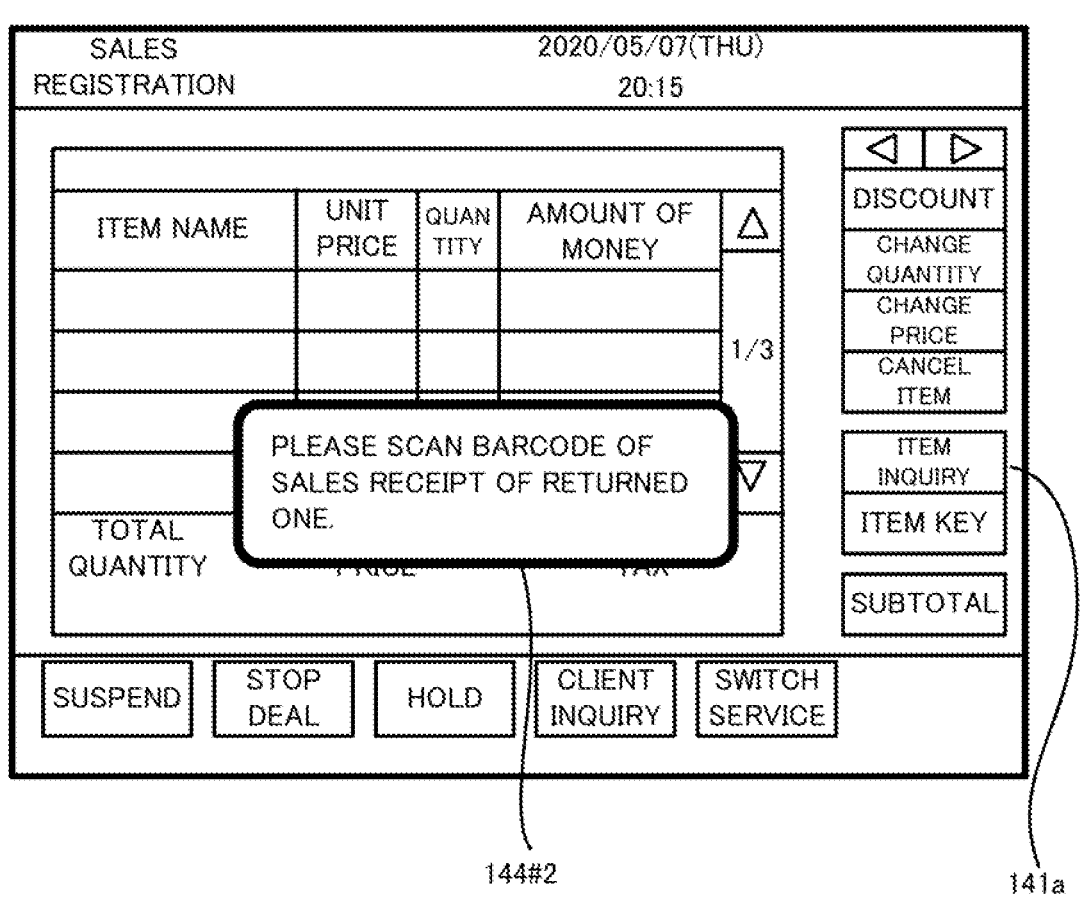
FIG. 7 is a planar view that illustrates the display screen of the display apparatus on which an assist display processing is performed.
Figure 8:
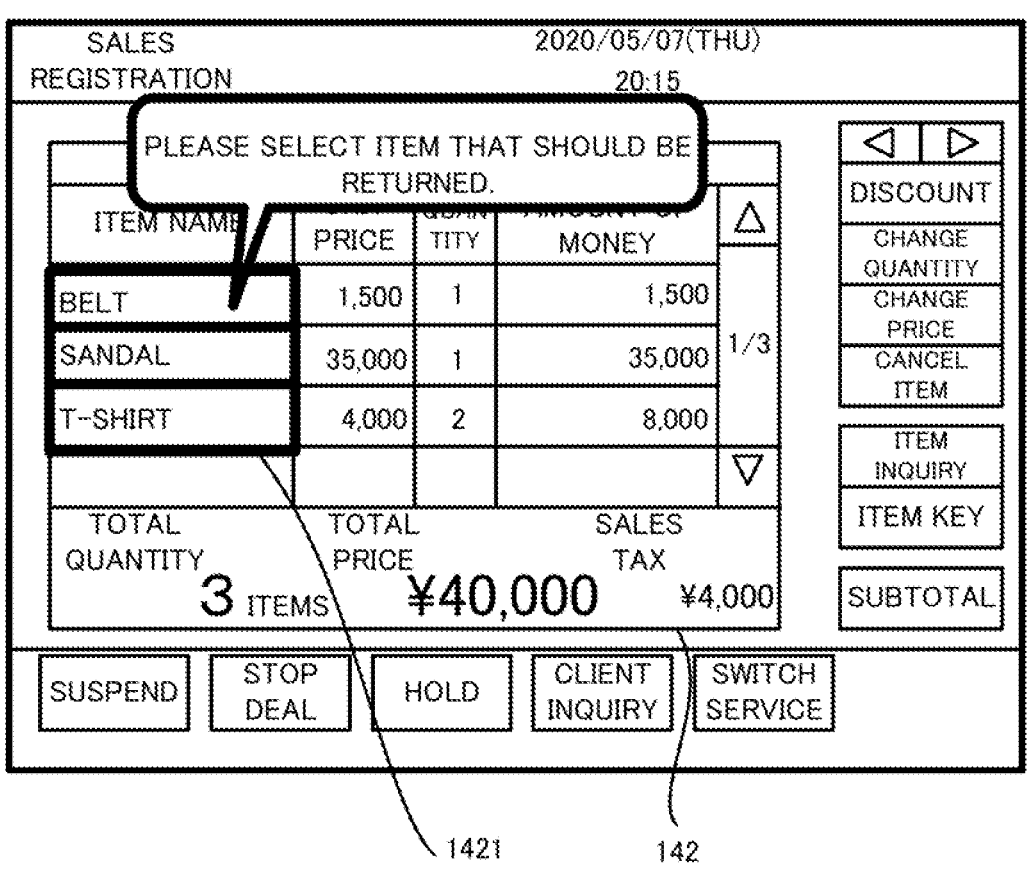
FIG. 8 is a planar view that illustrates the display screen of the display apparatus on which an assist display processing is performed.

Next, with reference to FIG. 6 to FIG. 8, a specific example of the assist display processing will be described. Each of FIG. 6 to FIG. 8 is a planar view that illustrates the display screen of the display apparatus 14 on which the assist display processing is performed. Note that in the below described description, a specific example of the assist display processing, which is performed when the user terminal 1 is the POS cash register, the display screen displayed in FIG. 5 is the present screen and user asks the question "how to perform an operation for return an item for which a sales receipt has already been issued?", will be described.

As described above, the assist display processing is started from the present screen illustrated in FIG. 5. Assume that the user should perform an operation for pushing the button 141a of "item inquiry" displayed on the present screen, then, scanning a barcode printed on the issued sales receipt (namely, a barcode indicating an information related to the sold item), and then, selecting the item that should be returned from a list of the items displayed on the display screen, in order to perform the operation for returning the item in a situation where the present screen illustrated in FIG. 5 is displayed.

In this case, firstly, as illustrated in FIG. 6, an display object for encouraging the user to push the button of "item inquiry" is newly displayed on the present screen by the assist display processing. For example, as illustrated in FIG. 6, a text message 144#1 for encouraging the user to push the button of "item inquiry" (namely, the display object for indicating the content of the operation that should be performed by the user on the present screen) may be newly displayed on the present screen by the assist display processing. For example, as illustrated in FIG. 6, the button 141*a* of "item inquiry" may be highlighted by the assist display processing. Namely, the operation target area in which the button 141*a* of "item inquiry" that should be operated by the user on the present screen is displayed may be highlighted by the assist display processing. As a result, the user can easily understand that the button 141*a* of "item inquiry" should be pushed firstly in order to perform the operation for returning the item.

Then, after the user pushes the button 141*a* of "item inquiry", as illustrated in FIG. 7, an display object for encouraging the user to scan the barcode of the sales receipt is newly displayed on the present screen by the assist display processing. For example, as illustrated in FIG. 7, a text message 144#2 for encouraging the user to scan the barcode of the sales receipt (namely, the display object for indicating the content of the operation that should be performed by the user following the operation for pushing the button 141*a* of "item inquiry") may be newly displayed on the present screen by the assist display processing. As a result, the user can easily understand that the barcode of the sales receipt should be scanned next in order to perform the operation for returning the item.

After the user scans the barcode of the sales receipt, the list of the sold items is displayed in the display field in the display screen. In this case, as illustrated in FIG. 8, an display object for encouraging the user to select the item that should be returned from the list of the item is newly displayed on the present screen by the assist display processing. For example, as illustrated in FIG. 8, a text message 144#3 for encouraging the user to select the item that should be returned from the list of the item (namely, the display object for indicating the content of the operation that should be performed by the user following the operation for scanning the barcode of the sales receipt) may be newly displayed on the present screen by the assist display processing. For example, as illustrated in FIG. 8, an article field 1421 indicating the list of the items that should be selected by the user may be highlighted by the assist display processing. Namely, the operation target area in which the article field 1421 that should be selected by the user may be highlighted by the assist display processing. As a result, the user can easily understand that the item that should be returned should be selected next in order to perform the operation for returning the item. Thus, the user can complete the operation for returning the item by selecting the item that should be returned. Alternatively, when another operation is furthermore necessary, an display object for encouraging the user to perform another operation is displayed by the assist display processing, and the user can complete the operation for returning the item by performing another operation in accordance with the displayed display object.

(4) Technical Effect

As described above, the operation assist server 2 in the present example embodiment performs the operation assist processing for assisting the operation by the user using the user terminal 1. Specifically, the operation assist server 2 allows the user terminal 1 to perform the assist display processing for displaying, on the display apparatus 14 of the user terminal 1, the procedure of the operation that should be performed by the user to perform the target operation. As a result, the user can perform the target operation by performing a series of operations with the procedure indicated by the assist display processing while referring to the display object displayed by the assist display processing.

Especially in the present example embodiment, the operation assist server 2 uses the screen information related to the present screen displayed on the display apparatus 14 of the user terminal 1 when the user asks the question about the operation of the user terminal 1, in order to determine the procedure of the operation that should be performed by the user. Thus, the operation assist server 2 is capable of determining the procedure of the operation that should be performed by the user starting from the present screen. As a result, the user can perform the target operation by performing a series of operations starting from the present screen, which is currently displayed on the display apparatus 14, with the procedure indicated by the assist display processing. Furthermore, the user can substantially learn the procedure of the operation that should be performed by the user starting from the present screen to perform the target operation by performing the target operation starting from the present screen. Thus, the user can perform the target operation without requiring the operation assist processing by the operation assist server 2 when the same operation is performed next starting from the same display screen. As a result, a frequency of assisting the operation of the user terminal 1 by the user is reduced. Thus, the operation assist server 2 is capable of reducing the frequency of assisting the operation of the user terminal 1 by the user while assisting the operation of the user terminal 1 by the user.

Moreover, the in the present example embodiment, the display object indicating the content of the operation that should be performed by the user is displayed by the assist display processing. Moreover, the operation target area that should be operated by the user is highlighted by the assist display processing. Thus, the user can intuitively understand the operation that should be performed next by the user. Thus, the user can easily perform a series of operations with the procedure indicated by the assist display processing while referring to the display object displayed by the assist display processing.

(5) Modified Example

In the above described description, the operation assist server 2 determines the procedure of the operation that should be performed by the user. However, the user terminal 1 may determine the procedure of the operation that should be performed by the user. Namely, the arithmetic apparatus 11 of the user terminal 1 may include the operation determination unit 211. In this case, the sound data and the screen information may not be transmitted from the user terminal 1 to the operation assist server 2. Moreover, the display control information may not be transmitted from the operation assist server 2 to the user terminal 1. Namely, the display control unit 112 of the user terminal 1 may control the display apparatus 14 to perform the assist display processing by performing the processing same as that of the display control unit 212 of the operation assist server 2.

In the above described description, the example in which the user terminal 1 is the POS cash register. Namely, an example in which the operation assist system SYS is applied to a store for selling the item. However, a target in which the operation assist system SYS is applied is not limited to the store. Since the user terminal 1 is an terminal that is operable by the user as described above, the operation assist system SYS may be used in any scene in which the user terminal 1 that is operable by the user is used. For example, the operation assist system SYS may be used for training new employees who have joined a company. In this case, a terminal apparatus (for example, a tablet or a personal computer) in which an application for training new employees is installed may be used as the user terminal 1. The new employee may ask how to operate the application for the target training to the user terminal 1. In this case, the operation assist server 2 may perform the operation assist processing for encouraging the new employee about the procedure of the operation necessary for receiving the proper training.

This disclosure is not limited to the above described example embodiment. This disclosure is allowed to be changed, if desired, without departing from the essence or spirit of the invention which can be read from the claims and the entire specification, and an information processing apparatus, an information processing method and a recording medium, which involve such changes, are also intended to be within the technical scope of this disclosure.

DESCRIPTION OF REFERENCE CODES

SYS operation assist system
1 user terminal
11 arithmetic apparatus
111 transmission control unit
112 display control unit
12 storage apparatus
13 sound record apparatus
14 display apparatus
15 input apparatus
16 communication apparatus
2 operation assist server
21 arithmetic apparatus
211 operation determination unit
212 display control unit
22 storage apparatus
23 communication apparatus

What is claimed is:

1. An information processing apparatus that is configured to assist an operation by an user of a terminal apparatus that is operable by the user, the information processing apparatus comprising:
at least one memory configured to store instructions; and
at least one processor configured to execute the instructions to:
determine a procedure of an operation that should be performed by the user based on sound data that indicates, as a sound, a question from the user about the operation of the terminal apparatus and an information related to a current screen displayed on a display of the terminal apparatus when the user asks the question about the operation of the terminal apparatus, the procedure comprising scanning a barcode of a receipt that indicates information about multiple items sold and selecting an item to be returned from a list of multiple items displayed on the display, wherein the multiple items are identified based on the barcode; and
control the display to perform an assist display processing for encouraging the user to operate the terminal apparatus with the determined procedure.

2. The information processing apparatus according to claim 1, wherein the at least one processor is configured to execute the instructions to:
determine the procedure of the operation that should be performed by the user starting from the current screen; and
control the display to start the assist display processing starting from the current screen.

3. The information processing apparatus according to claim 1, wherein the assist display processing includes a processing for displaying, on a display screen, a detail of the operation that should be performed by the user on the display screen of the display including the current screen.

4. The information processing apparatus according to claim 1, wherein the assist display processing includes a processing for highlighting an operation target area that should be performed by the user on a display screen of the display including the current screen.

5. The information processing apparatus according to claim 4, wherein the assist display processing includes a processing for highlighting a second operation target area that should be performed next by the user on the display screen, after the user operates a first operation target area that is highlighted on the display screen.

6. An operation assist system comprising:
the information processing apparatus according to claim 1; and
the terminal apparatus.

7. The operation assist system according to claim 6, wherein the terminal apparatus is configured to:
scan the barcode;
obtain the list of items based on the barcode; and
display the list of items on the display.

8. An information processing method of assisting an operation by an user of a terminal apparatus that is operable by the user, the information processing method comprising:
a determination operation at which a procedure of an operation that should be performed by the user is determined based on sound data that indicates, as a sound, a question from the user about the operation of the terminal apparatus and an information related to a current screen displayed on a display of the terminal apparatus when the user asks the question about the operation of the terminal apparatus, the procedure comprising scanning a barcode of a receipt that indicates information about multiple items sold and selecting an item to be returned from a list of multiple items displayed on the display, wherein the multiple items are identified based on the barcode; and
a control operation at which the display is controlled to perform an assist display processing for encouraging the user to operate the terminal apparatus with the determined procedure.

9. A non-transitory recording medium on which a computer program that allows a computer to execute an information processing method of assisting an operation by an user of a terminal apparatus that is operable by the user is recorded, the information processing method comprising:
a determination operation at which a procedure of an operation that should be performed by the user is determined based on sound data that indicates, as a sound, a question from the user about the operation of the terminal apparatus and an information related to a current screen displayed on a display of the terminal apparatus when the user asks the question about the operation of the terminal apparatus, the procedure comprising scanning a barcode of a receipt that indicates information about multiple items sold and selecting an item to be returned from a list of multiple items displayed on the display, wherein the multiple items are identified based on the barcode; and a control operation at which the display is controlled to perform an assist display processing for encouraging the user to operate the terminal apparatus with the determined procedure determined.

* * * * *